Figure 1:
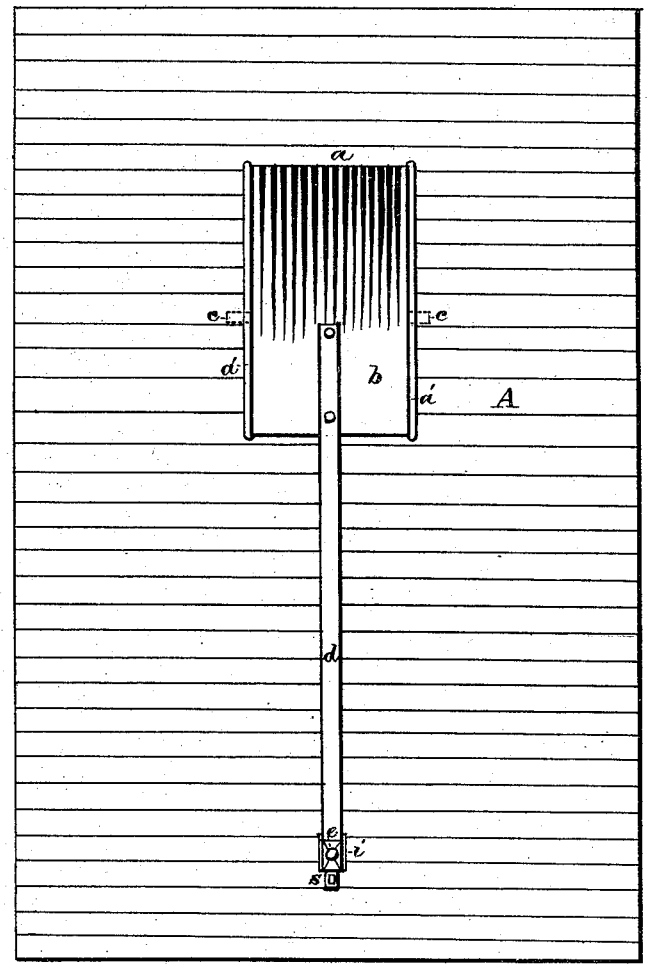

2 Sheets--Sheet 1.

A. McCREIGHT.
Dumping and Loading Machines.

No.154,610. Patented Sept. 1, 1874.

Attest.
B. C. Converse
C. W. Wadsworth

Inventor.
Alexander McCreight
By B. C. Converse
His Atty,

A. McCREIGHT.
Dumping and Loading Machines.
No. 154,610. 
2 Sheets--Sheet 2.
Patented Sept. 1, 1874.
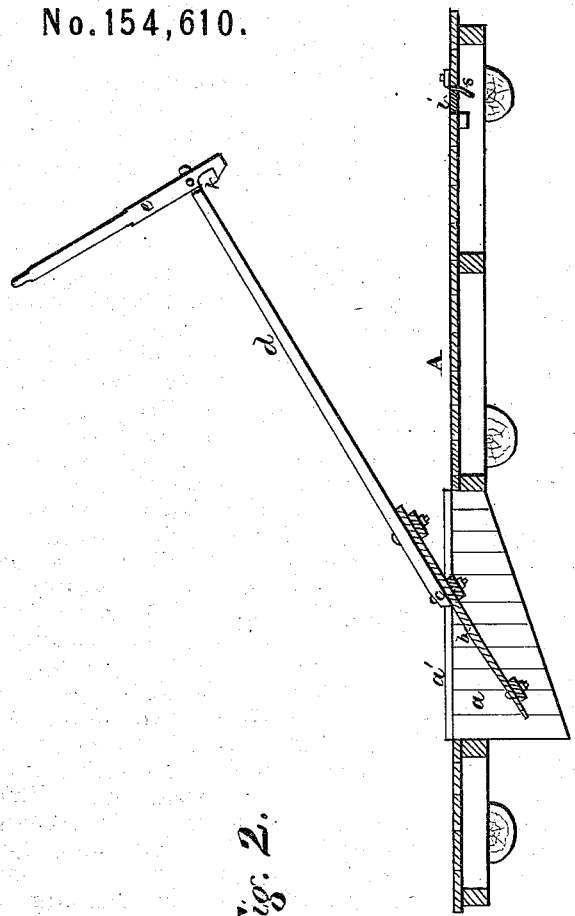
Fig. 2.
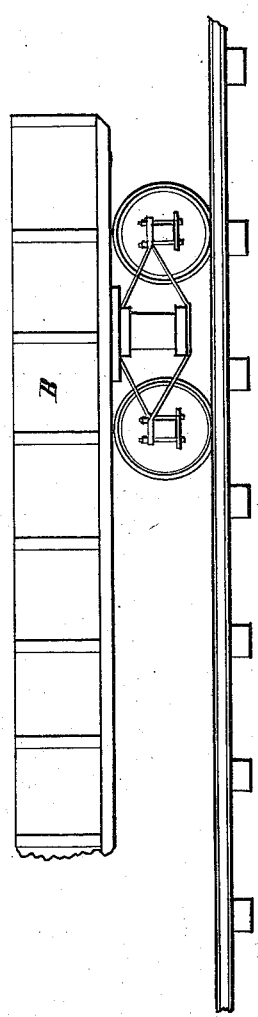
Witnesses.
B. C. Converse
C. W. Wadsworth
Inventor.
Alexander McCreight
By B. C. Converse
His Atty.

UNITED STATES PATENT OFFICE.

ALEXANDER McCREIGHT, OF SPRINGFIELD, OHIO.

IMPROVEMENT IN DUMPING AND LOADING MACHINES.

Specification forming part of Letters Patent No. 154,610, dated September 1, 1874; application filed September 23, 1872.

*To all whom it may concern:*

Be it known that I, ALEXANDER MC-CREIGHT, of the city of Springfield, in the county of Clarke and State of Ohio, have invented an Improved Dumping and Loading Machine, of which the following is a specification:

My invention consists in a platform with a scuttle-hole having a self-closing trap, constructed and arranged so that it can be filled by an ordinary road-scraper with gravel, dirt, or other excavated material from either side; and, when filled, the trap is tripped with a spring-lever, its contents discharged into a cart or other receptacle placed under it, making the operation of loading carts, cars, or boats with gravel, dirt, coal, or other excavated material an easy and rapid one, and rendering the use of shovels for that purpose unnecessary. In hill-sides an excavation may be made sufficiently large to back in the car, cart, or other receptacle for receiving the gravel or dirt under the dumping-trap, the ground over the excavation being leveled enough to give the platform a horizontal position, and timber-stringers laid across over the pit, on which it is placed; or, if preferred, it can be placed on trestles. Excavations can then be made to any extent on each side and in rear of it, and the gravel or other material dragged with a scraper over the platform and dumped upon the trap, the teams crossing and recrossing from either side. Two or more teams can be worked with it, scraping in a circle the line of which crosses the trap. A ledge rises on each side of the scuttle to keep the dirt or gravel from rolling on the platform, and also to catch the forward end of the scraper when it gets to the trap, so that it will be certain to turn over and leave its load directly on it.

Figure 1 is a plan view of my dumping and loading machine. Fig. 2 is a sectional elevation of the same, showing the trap open for discharging into a car, a section of which is seen on a track, under the dumping and loading machine, as it is used when set for operation over a pit or on trestles.

A is the platform, which is made of strong plank nailed to a timber-frame. It may be made in one piece, or it may be made in sections for easier handling and transportation, and bolted together when set up for use. It is provided with a scuttle-hole, $a$. The platform is made from sixteen to twenty feet long, and from twelve to sixteen feet wide. The scuttle-hole $a$ is about six feet long and four feet wide. For loading into boats or cars, larger dimensions than these may be used; but the proportions are about the same. The scuttle-hole or chute is planked down a foot or more below the top of the platform inside to give direction to the discharged dirt or gravel. This planking can be extended lower, if required. The strips or ledges $a'$ on each side of the scuttle-hole $a$ catch the point of the scraper and turn out its contents on the trap $b$, which is pivoted at the points $c$ (shown in dotted lines in Fig. 1) near its center. It will be seen that the trap $b$ is inclined downward toward its front part, so that it will discharge its load easily when tilted. This inclination brings the surface of its front some inches below the platform level, allowing it to hold about a cubic yard of gravel, so that, by tallying the number of loads discharged, the quantity of gravel or other material removed can be easily estimated.

$d$ is a long lever, rigidly attached to $b$ to keep it closed while being loaded. At its extreme end a hand-lever, $e$, is pivoted, by which the trap $b$ is operated. The lower end of $e$ passes down through the hole $i$ in the platform, the notch $k$ catching under the edge and securing it in position when the trap is closed and being loaded. To prevent the hand-lever from slipping out the spring $s$ is provided. It is fastened at the back part of the hole $i$, its free end, which is curved, pressing the lower end of $e$ forward after it has passed down far enough to throw the notch $k$ into place. $b$ is made of strong plank, well battened, and hung upon an axle of iron or wood. It will bear the required weight of horses and dirt, and turns easily on the pivots $c$. One of the horses passes over it in crossing the platform with the loaded scraper. The driver of the scraper can operate the trap $b$, as he has only to throw the lever $e$ forward to release it, when the trap tilts with its load and discharges. It is self-setting, the weight of the long lever $d$ bringing it down after each discharge.

In excavating dirt, gravel, or other material, not over one-fourth the number of hands is required in moving a given quantity that it takes to do the same work with shovels; and it can be done with my dumping and loading machine in a much less time.

I claim as my invention—

Hand-lever $e$ and spring $s$, combined with lever $d$, trap-door $b$, and platform A, having hole $i$, as and for the purpose set forth.

ALEXR. McCREIGHT.

Witnesses:
B. C. CONVERSE,
WALTER L. WEAVER.